W. F. Veber,
Sliding Gate.
Nº 64,171. Patented Apr. 23, 1867.

Witnesses.
Frank Alden
J. Holmes.

Inventor
Wm. F. Veber

United States Patent Office.

WILLIAM F. VEBER, OF PERRYSBURG, OHIO.

Letters Patent No. 64,171, dated April 23, 1867.

FENCE GATE.

The Schedule referred to in these Letters Patent and making part of the same.

TO ALL WHOM IT MAY CONCERN:

Be it known that I, W. F. VEBER, of Perrysburg, in the county of Wood, and State of Ohio, have invented certain new and useful improvements in Fence Gates; and I do hereby declare that the following is a full and complete description of the same, reference being had to the accompanying drawings, making a part of this specification, in which—

Figure 1:
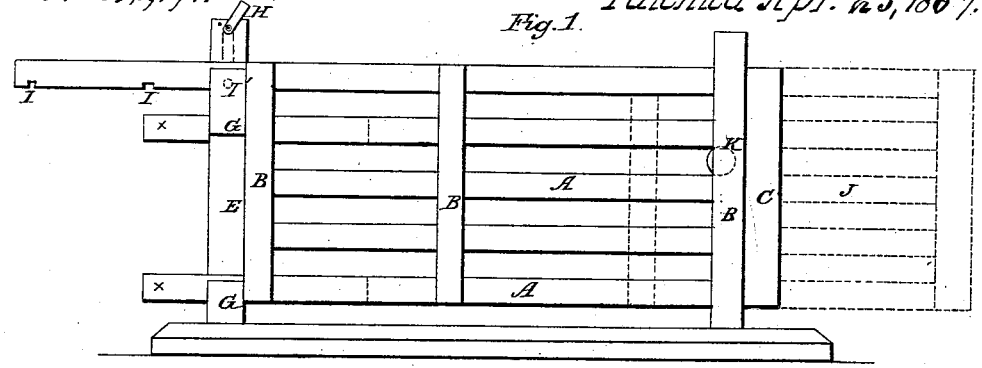
Figure 3:
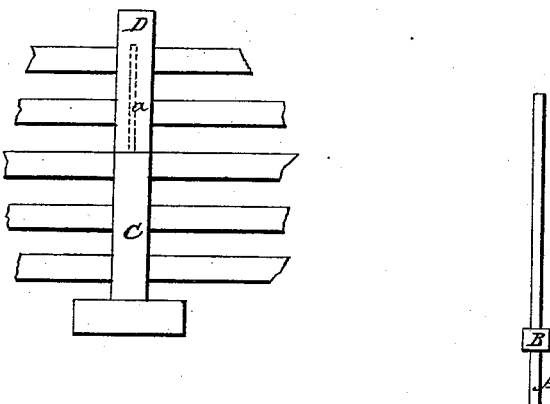
Figure 2:
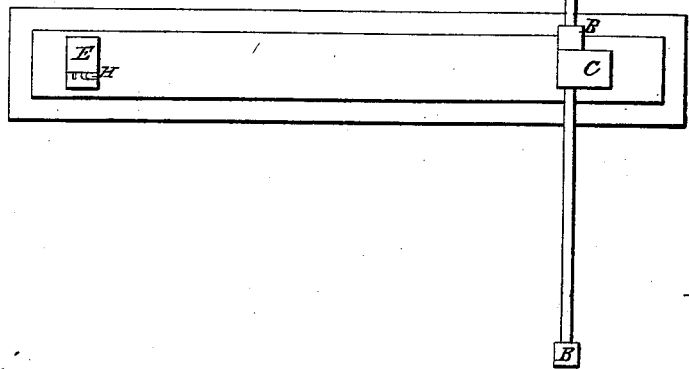

Figure 1 is a side view of the gate when shut.
Figure 2 is a top view of the gate when open.
Figure 3 is a detached section.
Like letters of reference refer to like parts in the different views presented.

This gate consists of several bars A, fig. 1, which are nailed or otherwise secured to the cleats or cross-bars B, one on each side, as seen in fig. 2. It will be seen that the second bar from the top and the first at the bottom are longer than the two central ones, and that the top bar is considerably longer than either, the purpose of which will be hereafter shown. The post by which the gate is supported consists of two sections, C and D, section C being inserted in the ground in the ordinary way, and section D pivoted to it by the dowel-pin $a$, as indicated by the dotted lines in fig. 3. E is the head post of the gate, upon which the free end rests, when closed, in slotted shoulders or stays G, and is prevented from being lifted up by the button H being dropped down upon the edge of the bar; as indicated by the dotted lines. It is also held from any lateral displacement by the notches I dropping on the pin I'.

The manner of opening this gate is as follows: The button, on being turned up, as shown in the drawing, the gate is raised and pushed back in the direction indicated by the dotted lines J, fig. 1, moving on the roller K. When it has been pushed back far enough to disengage the upper bar from the head post, it is swung around upon the section of the post D, parallel to the carriage-way, as shown in fig. 2. At this point the gate is equally balanced, and requires but little effort to swing it. By pushing back the gate only far enough to allow the notch at the end of the upper bar to catch on the pin, will give room for the passage of persons between the projecting ends of the bars $x\ x$ and the post E. By pushing it back a less distance, so that the middle notch will cacth on the pin I', it will still lessen the opening, so as to allow the passage of small animals, and at the same time keep back the larger stock. In either position the gate is prevented from any lateral displacement, or from being lifted up and opened, by means of the button and notch referred to.

What I claim as my improvement, and desire to secure by Letters Patent, is—

The gate A, as constructed, in combination with the jointed or pivoted post G, as and for the purpose set forth.

WM. F. VEBER.

Witnesses:
A. L. FOWLER,
W. H. BURRIDGE.